(12) United States Patent
Benhelal et al.

(10) Patent No.: US 11,833,469 B2
(45) Date of Patent: Dec. 5, 2023

(54) MULTISTAGE MINERAL CARBONATION

(71) Applicant: Mineral Carbonation International Pty Ltd, Braddon (AU)

(72) Inventors: Emad Benhelal, Wallsend (AU); Geoffrey Frederick Brent, Valentine (AU); Eric Miles Kennedy, Newcastle (AU); Timothy Kenilworth Oliver, Adamstown Heights (AU); Mark Stuart Rayson, Bar Beach (AU); Michael Stockenhuber, Bolwarra Heights (AU)

(73) Assignee: Mineral Carbonation International Pty Ltd, Braddon (AU)

( * ) Notice: Subject to any disclaimer, the term of this patent is extended or adjusted under 35 U.S.C. 154(b) by 663 days.

(21) Appl. No.: 17/053,013

(22) PCT Filed: May 8, 2019

(86) PCT No.: PCT/AU2019/050424
§ 371 (c)(1),
(2) Date: Nov. 4, 2020

(87) PCT Pub. No.: WO2019/213705
PCT Pub. Date: Nov. 14, 2019

(65) Prior Publication Data
US 2021/0370233 A1    Dec. 2, 2021

(30) Foreign Application Priority Data
May 8, 2018   (AU) .............................. 2018901560

(51) Int. Cl.
*B01D 53/80* (2006.01)
*B01D 53/62* (2006.01)
(Continued)

(52) U.S. Cl.
CPC ............ *B01D 53/73* (2013.01); *B01D 53/75* (2013.01); *B01D 53/78* (2013.01); *B01D 53/80* (2013.01);
(Continued)

(58) Field of Classification Search
None
See application file for complete search history.

(56) References Cited

U.S. PATENT DOCUMENTS

| 4,260,192 | A  | 4/1981  | Shafer        |
|-----------|----|---------|---------------|
| 2008/0299024 | A1 | 12/2008 | Gorset et al. |
| 2016/0332114 | A1 | 11/2016 | Mercier et al. |

FOREIGN PATENT DOCUMENTS

WO    2006/008242 A1    1/2006

OTHER PUBLICATIONS

Hemmati, A., et al., Process optimization for mineral carbonation in aqueous phase, International Journal of Mineral Processing, 2014, pp. 20-27.

*Primary Examiner* — Daniel Berns
(74) *Attorney, Agent, or Firm* — Howard & Howard Attorneys PLLC

(57) ABSTRACT

The present invention provides an integrated process for carbon dioxide capture, sequestration and utilisation, which comprises:
a) providing an aqueous slurry comprising an aqueous liquid and a particulate solid comprising an activated magnesium silicate mineral;
b) in a dissolution stage, contacting a $CO_2$-containing gas stream with the aqueous slurry at a first pressure to dissolve magnesium from the mineral to provide a slurry comprising a magnesium ion enriched carbonated aqueous liquid and a magnesium depleted solid residue; and
c) in a precipitation stage, precipitating magnesium carbonate from magnesium ions dissolved in step b) by multiple (Continued)

Figure 1:
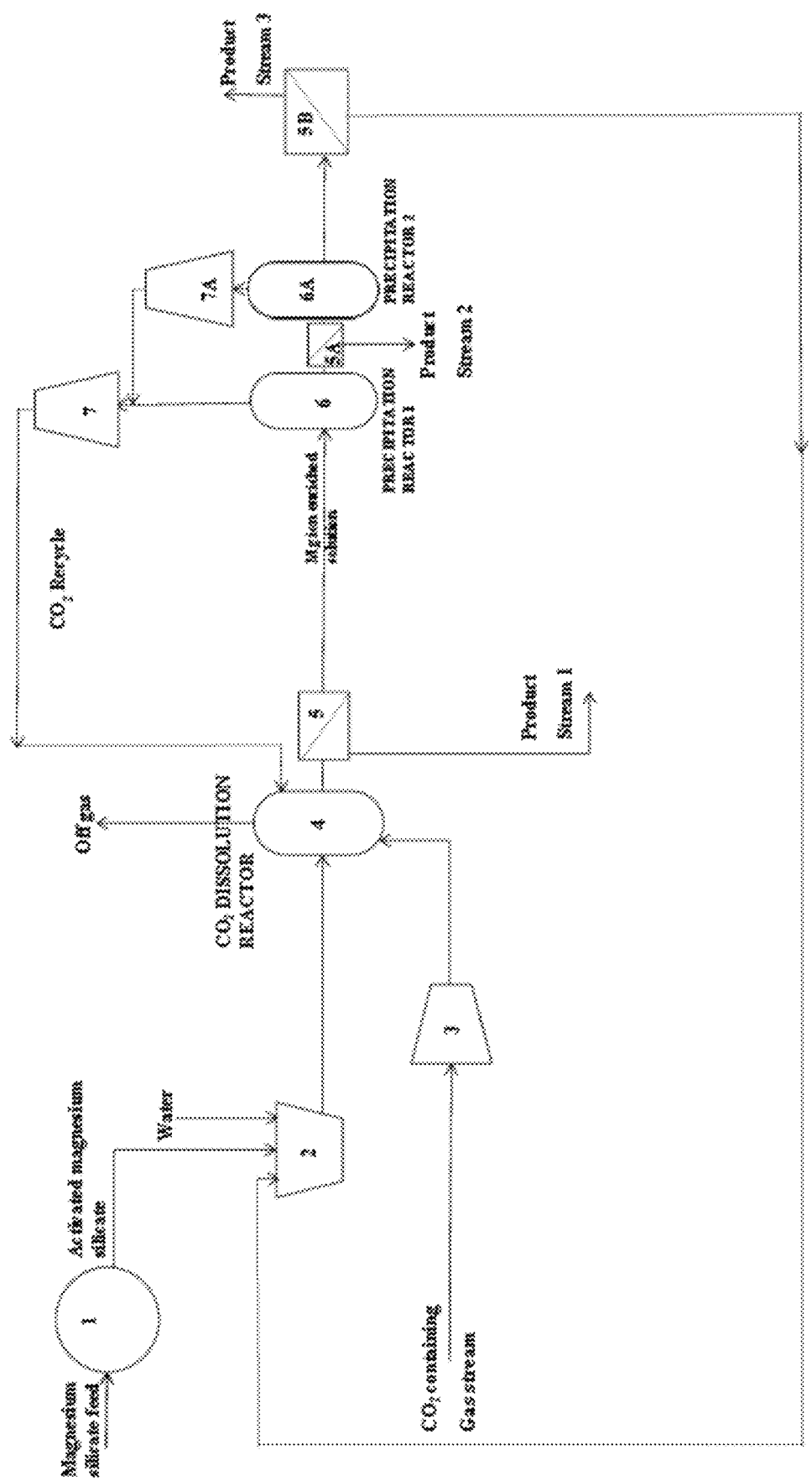

successive stage-wise reductions in pressure, with each stage being at a lower pressure than the preceding stage; wherein each successive stage-wise reduction in pressure releases $CO_2$ which is correspondingly stage-wise compressed and recycled back into the dissolution stage.

13 Claims, 3 Drawing Sheets

(51) Int. Cl.
    *B01D 53/73*     (2006.01)
    *B01D 53/75*     (2006.01)
    *B01D 53/78*     (2006.01)
    *B01J 8/00*     (2006.01)
    *C01F 5/24*     (2006.01)
    *C01B 33/12*     (2006.01)

(52) U.S. Cl.
    CPC ........... *B01J 8/0015* (2013.01); *C01B 33/128* (2013.01); *B01D 2251/402* (2013.01); *B01D 2257/504* (2013.01); *B01J 2208/003* (2013.01); *B01J 2208/00539* (2013.01)

MULTISTAGE MINERAL CARBONATION

CROSS-REFERENCE TO RELATED APPLICATIONS

The present application is the National Stage of International Patent Application No. PCT/AU2019/050424, filed May 8, 2019, which claims priority to and all the benefits of Australian Patent Application No. 2018901560, filed May 8, 2018, all disclosures of which are expressly incorporated herein by reference in their entirety.

FIELD OF THE INVENTION

The present invention relates to a process for carbon dioxide capture, sequestration and utilisation (CCSU) and to a reactor system suitable for implementing the process.

BACKGROUND TO THE INVENTION

The sequestration of carbon dioxide gas in repositories that are isolated from the atmosphere is a developing technology that is widely recognised as an essential element in global attempts to reduce carbon dioxide emissions to the atmosphere. The rapid increase in atmospheric carbon dioxide concentrations is of concern due to its properties as a greenhouse gas and its contribution to the phenomena of global warming and climate change. Prototype demonstration facilities for carbon dioxide capture and sequestration (CCS) exist in several countries and commercial scale operations have recently also emerged. While various technologies exist for the capture and concentration of carbon dioxide from combustion flue gases, such as in coal combustion for electrical power generation, most current facilities utilise underground sequestration by injection of pressurised carbon dioxide into suitable underground repositories. This is commonly known as geosequestration. This may occur in depleted oil or gas reservoirs or other underground porous formations that are suitably isolated from the atmosphere. These reservoirs or formations may be situated under land or sea. Another possible subterranean repository for carbon dioxide gas is so-called saline aquifers. Direct storage of carbon dioxide on the floor of the deep ocean has also been investigated but has yet to be successfully demonstrated on any significant scale.

Another field of study for carbon dioxide sequestration is that known as mineral carbonation, whereby carbon dioxide is chemically reacted with alkali or alkaline-earth metal oxide or silicate minerals to form stable solid carbonates. This approach is known as ex-situ mineral carbonation, as opposed to in-situ carbonation whereby carbon dioxide is deposited into underground mineral formations and reacts over longer timeframes with suitable minerals in existing underground formations. The present invention is concerned with the ex-situ approach to carbon dioxide sequestration via mineral carbonation of silicate minerals to form carbonates.

Mineral carbonation has many potential advantages over other methods of carbon dioxide sequestration. These include permanence and stability of the formed carbonates and the elimination of any risks of leakage of carbon dioxide gas. Furthermore, suitable subterranean sites for geosequestration do not exist at all locations where they are required near to carbon dioxide emission sources. The chemical reactions of mineral carbonation are also thermodynamically favoured, with an exothermic release of energy due to the formation of the carbonates. The raw silicate minerals required for mineral carbonation are abundant and widely distributed globally. These minerals may be readily mined and subjected to known comminution and other processing technologies. They are generally benign and the environmental and safety risks are readily manageable. In particular, the magnesium silicate mineral broadly known as serpentinite has been estimated to be available in quantities sufficient to sequester all global emissions of carbon dioxide from known fossil fuel reserves.

So-called single stage carbonation processes such as that described by O'Connor et al., 2005-Aqueous Mineral Carbonation: Mineral Availability, Pre-treatment, Reaction Parametrics and Process Studies, DOE/ARC-TR-04-002-Albany Research Center, Albany, OR, USA, comprise the dissolution of magnesium from the activated mineral and precipitation of magnesium carbonate within a single stage, thereby producing a mixture of unreacted mineral, magnesium carbonate and silica. This mixture is difficult to separate into viable products. The extent of conversion of magnesium to magnesium carbonate is also limited.

So-called two stage or multi stage carbonation processes comprise separate magnesium dissolution and magnesium carbonate precipitation stages. The magnesium dissolution stage uses a carbon dioxide ($CO_2$) containing gas stream. Various workers have described such processes, including Mercier et al. (U.S. Pat. No. 9,440,189B2) and Werner et al., Flue gas $CO_2$ mineralization using thermally activated serpentine: from single- to double-step carbonation, Physical Chemistry Chemical Physics 16 (2014) 24978-24993.

Existing multi-stage processes for carbonation of mineral ores are not yet sufficiently efficient for industrial application, either through low dissolution or precipitation rates and high energy and process costs.

Against this background it would be desirable to provide a new integrated process that sequesters $CO_2$ into carbonate and produces silica rich products in a more efficient manner than previously described.

SUMMARY OF THE INVENTION

The present invention seeks to provide a process for the permanent and safe capture and sequestration of carbon dioxide gas while producing products of economic value. The present invention is particularly concerned with an efficient and economically viable integrated process for the chemical conversion of carbon dioxide and magnesium silicate feedstocks to solid carbonates and silicates thereby enabling a reduction in the amount of carbon dioxide discharged to the atmosphere while simultaneously producing products of economic utility and value, in particular magnesium carbonates and silica. This utilisation of products categorises the process of the invention as carbon dioxide capture, sequestration and utilization (CCSU), as opposed to CCS.

The present invention provides an integrated process for carbon dioxide capture, sequestration and utilisation, which comprises:
a) providing an aqueous slurry comprising an aqueous liquid and a particulate solid comprising an activated magnesium silicate mineral;
b) in a dissolution stage, contacting a $CO_2$-containing gas stream with the aqueous slurry at a first pressure to dissolve magnesium from the mineral to provide a slurry comprising a magnesium ion enriched carbonated aqueous liquid and a magnesium depleted solid residue; and
c) in a precipitation stage, precipitating magnesium carbonate from magnesium ions dissolved in step b) by multiple successive stage-wise reductions in pressure, with each stage being at a lower pressure than the preceding stage; wherein each successive stage-wise reduction in pressure releases $CO_2$ which is correspondingly stage-wise compressed and recycled back into the dissolution stage.

The present invention also provides a reactor system adapted to perform the processes of the present invention. The reactor system comprises two or more precipitation reactors that are each adapted to provide the stage wise reduction in pressure while enabling recovery of precipitated magnesium carbonates. The reactor system may comprises one or more dissolution reactors. Where more than one dissolution reactor is used, the dissolution reactors may in turn operate at successively increased pressures.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that prior publication (or information derived from it) or known matter forms part of the common general knowledge in the field of endeavor to which this specification relates.

BRIEF DISCUSSION OF DRAWINGS

Figure 2:
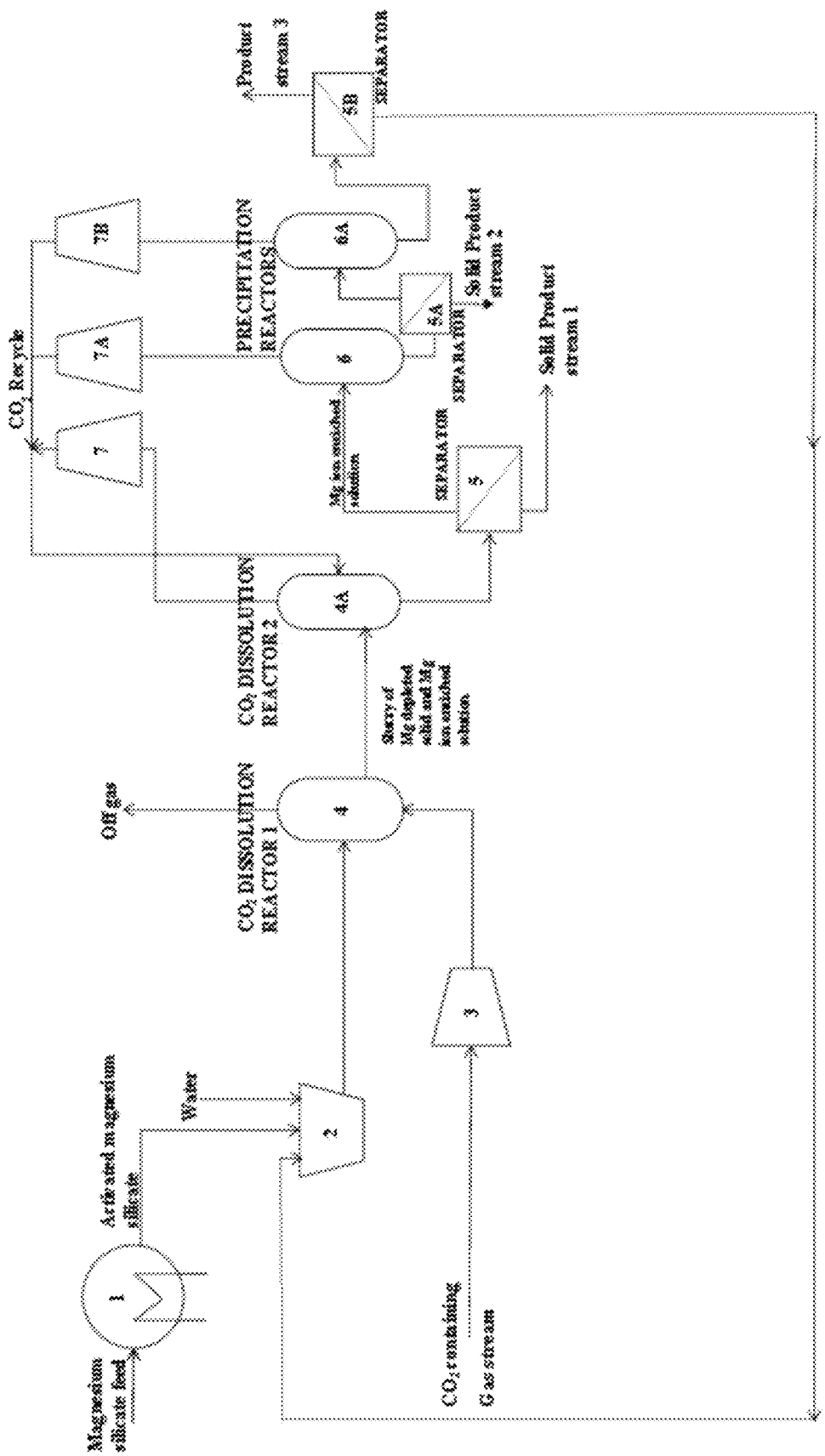
Figure 3:
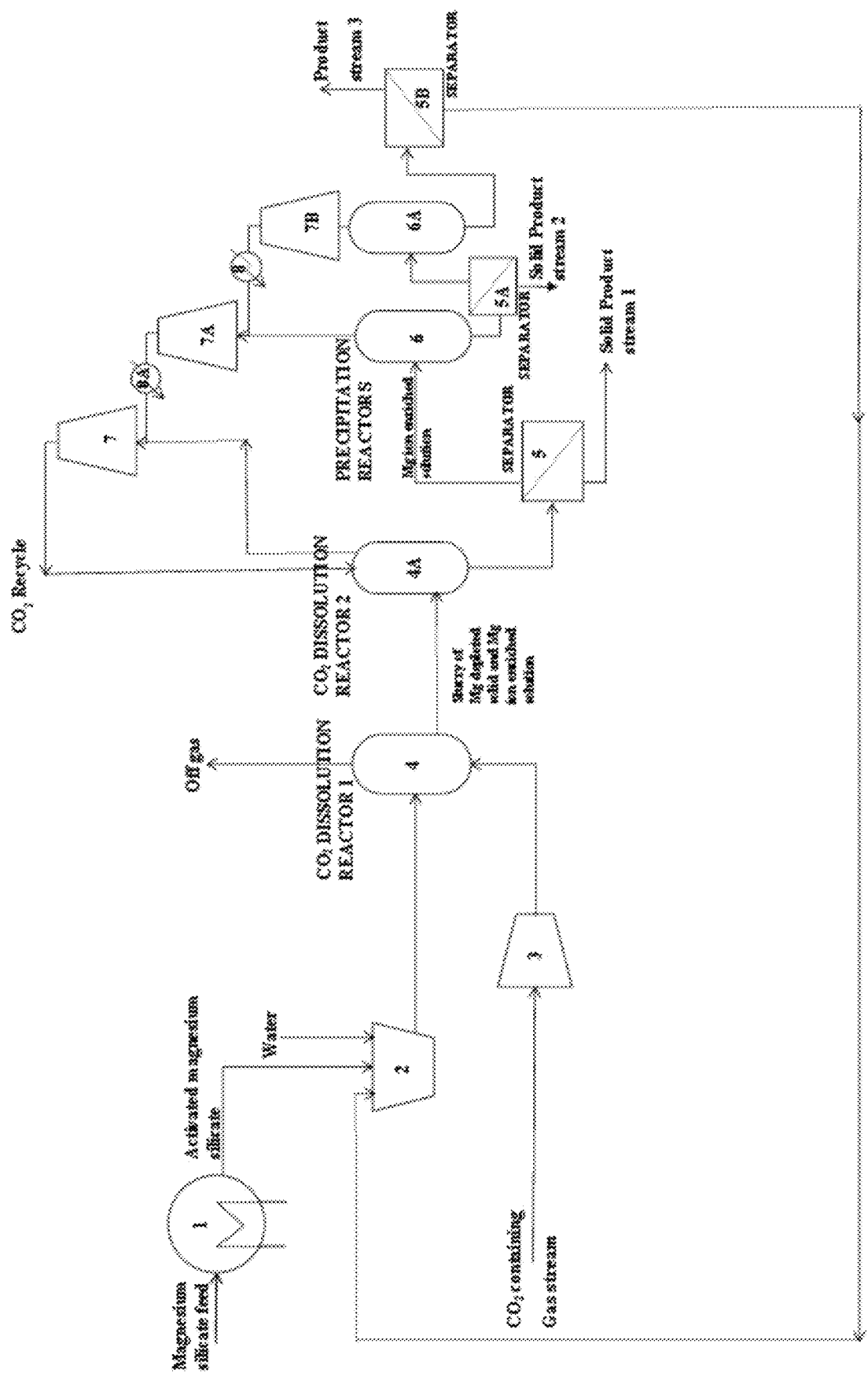

Embodiments of the present invention are illustrated with reference to the accompanying non-limiting drawings in which FIG. 1 is a flowsheet illustrating the process of Example 1, FIG. 2 is a flowsheet illustrating the process of Example 2 and FIG. 3 is a flowsheet illustrating the process of Example 3.

DETAILED DISCUSSION OF THE INVENTION

In accordance with the invention magnesium ions are provided in aqueous liquid by dissolution from activated mineral in particulate form.

The present invention employs an initial dissolution stage in which an aqueous slurry containing an activated magnesium silicate mineral (in particulate form) is contacted with a $CO_2$-containing gas stream under pressure. This dissolves magnesium from the mineral to provide a slurry comprising a magnesium ion enriched carbonated aqueous liquid and a magnesium depleted solid residue. Magnesium dissolved in this dissolution stage, and possibly one or more additional dissolution stages, is used for precipitation of magnesium carbonate.

The dissolution reaction will yield magnesium ions in aqueous solution together with carbonate and bicarbonate counterions. If distinct dissolution stages (reactors) are used the magnesium ion enriched carbonated aqueous liquid produced by each stage (reactor) may be combined prior to precipitation. However, this is not essential.

In the context of the present invention mineral carbonation refers to an overall process in which carbon dioxide is reacted with magnesium from an activated magnesium silicate mineral feedstock to form magnesium carbonates and silica. Reference to activated magnesium silicate mineral refers to magnesium silicate mineral that has been activated by grinding or heating or both. In the invention reactions take place in aqueous liquids with the magnesium being leached out of the magnesium silicate into aqueous liquid in a dissolution stage or stages and the magnesium carbonate precipitating out of at least one such liquid in two or more precipitation stages.

Reference to a dissolution stage refers to a process stage wherein (magnesium) metal ions are leached from the solid mineral into aqueous liquid. Reference to aqueous liquid includes liquids wherein water is the major constituent (greater than 50% by mass). The aqueous liquid may contain as a minor constituent (less than 50% by mass) dissolved species such as solid(s) or water miscible liquid(s). Seawater, brines and saline solutions are included herein. The reference to aqueous liquid also embraces gas species such as $CO_2$ dissolved in water. The reference to aqueous liquid further embraces an acid or acid salt dissolved in water. The aqueous liquid may contain a combination of components as herein described.

The aqueous liquid of course also contains undissolved particulate solid. The particulate solid comprises at least activated magnesium silicate mineral. That particulate solid in the aqueous liquid provides for the aqueous slurry. One or more other particulate solids may also be present in the aqueous liquid. The particulate solid will generally be in a suspended state within the aqueous liquid.

Reference to magnesium ion enriched carbonated aqueous liquid(s) includes liquids where magnesium ions are in solution together with bicarbonate and carbonate counterions.

The $CO_2$-containing gas stream used in the dissolution stage(s) may be from the same or different source. The gas stream may comprise a flue gas from a hydrocarbon combustion process or it may be a relatively pure stream of $CO_2$ captured from a hydrocarbon combustion, oxidation or reforming process or from natural gas processing. Such a stream may comprise $CO_2$ concentrations in the range 2-100% by volume. Capture processes are well known and may comprise the use of amines or other $CO_2$ absorbents or adsorbents or selective membranes to separate $CO_2$ from flue gas, or pre-combustion capture such as by so-called oxy-fuel combustion. The $CO_2$-containing gas stream used in a dissolution stage may comprise $CO_2$ released and recycled from a precipitation stage.

Reference to a precipitation stage includes processes where magnesium ions in aqueous liquid are precipitated out of solution as solid magnesium carbonate, which may be in the form of magnesite or hydrated magnesium carbonate, including hydromagnesite, dypingite and nesquehonite or mixtures thereof. Precipitation occurs through multiple (i.e. two or more) successive stage-wise reductions in pressure. Each stage-wise reduction of pressure releases $CO_2$ and causes precipitation of the magnesium carbonate as the pH is raised. The $CO_2$ released from each stage is correspondingly stage-wise recompressed and recycled back into the dissolution stage. The released $CO_2$ from each stage may be recompressed to the pressure of the preceding stage or to the pressure of the dissolution stage.

This stagewise recompression of released $CO_2$ reduces the overall energy required for recompressing all the $CO_2$ back to the pressure of the dissolution stage. Cooling of the compressed streams between recompression stages will further reduce the overall recompression energy required and will facilitate recovery of entrained water or water vapour to be recycled to the process at optimal points. Precipitation in each stage may also be facilitated by changing one or more other process conditions such as temperature.

Herein, unless otherwise clear from context, reference to magnesium carbonate includes hydrated forms of magnesium carbonate including hydromagnesite, dypingite and nesquehonite or mixtures thereof.

The initial particulate solid used as feedstock in the process of the invention comprises activated magnesium silicate mineral such as olivine, serpentinite, dunite or mixtures thereof. The solid may be ground to particle sizes whereby the mass median diameter ($D_{50}$) is in the range 5-250 microns, preferably 20-150 microns. Before or after grinding, the mineral may be heated to activate it for dissolution. Some feedstocks may not require heating and may be sufficiently activated by grinding; thereby comprising an activated magnesium silicate mineral.

The magnesium silicate mineral may be activated by heating particulate mineral to elevated temperature, for example within the range 570° C.-700° C. to form an activated particulate solid comprising dehydroxylated magnesium silicate. The activated particulate solid comprises dehydroxylated magnesium silicate and is usually cooled to below 200° C. prior to mixing with aqueous liquid (e.g. water) to provide an aqueous slurry. In this embodiment, heat from the heated activated solid may be recovered for beneficial use, such as heating another process stream or producing steam for electrical power generation The magnesium depleted solid residue from any dissolution stage may subjected to a wet magnetic separation process to extract an iron-rich portion therefrom. That iron-rich portion may be extracted before any subsequent processing and represents a valuable product.

The magnesium depleted solid residue from any dissolution stage may be recovered from the process and silica therein recovered as another valuable product, whether subjected to magnetic separation or not. The magnesium depleted solid residue may be subjected to chemical processing, for example acid leaching, to purify silica contained therein.

The pressures and temperatures or other operating conditions of each stage of the process may be varied to optimise reactions in each stage. The absolute pressures may be maintained in the range 5 kPa to 20000 kPa and temperatures in the range 10° C. to 200° C. Preferably the pressures in each dissolution stage is in the range 100-20000 kPa and temperatures are in the range 20° C.-185° C. Preferably the pressures in the precipitation stages are lower than in the dissolution stage(s) and are in the range 5-5000 kPa and temperatures are in the range 20° C.-150° C. Pressures in each precipitation stage are lower than the preceding stage. Temperatures or other operating conditions may also be varied to optimise the dissolution or precipitation occurring in each stage.

In one embodiment the invention provides a process in which a magnesium ion enriched carbonated liquid is produced by dissolving an activated magnesium silicate mineral in one or more reactors fed by an input $CO_2$-containing gas stream above atmospheric pressure and thereafter, in two or more precipitation stages, inducing a pH shift in the liquid by the removal of dissolved $CO_2$ through reducing the pressure to the liquid thereby precipitating the magnesium carbonate. The pressure is progressively reduced in a stage-wise fashion with each stage having a lower absolute pressure than the preceding stage. Each stage-wise reduction of pressure releases $CO_2$ and causes precipitation of the magnesium carbonate as the pH is raised. The $CO_2$ released from each stage is correspondingly stage-wise recompressed and recycled back into the dissolution stage. The released $CO_2$ from each stage may be recompressed to the pressure of the preceding stage or to the pressure of the dissolution stage.

In one embodiment the invention provides a process in which a magnesium ion enriched carbonated liquid is produced by dissolving an activated magnesium silicate in one or more reactors fed by an input $CO_2$-containing gas stream near, at or above atmospheric pressure and thereafter, in two or more separate precipitation stages, inducing a pH shift in the solution by the removal of dissolved $CO_2$ through the application of a partial vacuum or sub-atmospheric pressure in at least one of the precipitation stages thereby precipitating the magnesium carbonate. The pressure is progressively reduced in each precipitation stage with each stage having a lower absolute pressure than the preceding stage. Each stage-wise reduction of pressure releases $CO_2$ and causes precipitation of the magnesium carbonate as the pH is raised. The $CO_2$ released from each stage is correspondingly stage-wise recompressed and recycled back into the dissolution stage. The released $CO_2$ from each stage may be recompressed to the pressure of the preceding stage or to the pressure of the dissolution stage. This stage-wise recompression of released $CO_2$ reduces the overall energy required for recompressing all the $CO_2$ back to the pressure of the dissolution stage. Cooling of the compressed streams between recompression stages will further reduce the overall recompression energy required and will facilitate recovery of entrained water or water vapour to be recycled to the process at optimal points.

In one such embodiment, the $CO_2$ released from a precipitation stage is compressed to the pressure of the preceding precipitation stage and is blended with the $CO_2$ released from the said preceding stage prior to further compression and recycling back to the dissolution stage. In one such embodiment, cooling is provided between each point of compression to reduce the energy required for further compression. Water condensed by cooling after each point of compression may be removed from the gas stream and recycled back to the process.

Advantages provided by the invention may be derived from:
  recovering substantially pure streams of $CO_2$ from the precipitation stages that can be recycled back to a dissolution stage thereby providing higher concentrations of $CO_2$ for dissolution compared to a flue gas input stream;
  substantial energy savings in recompression of these streams due to the stage-wise reductions in pressure in the precipitation stages. Less overall energy is required to recompress the $CO_2$ released from each stage than would be the case if all the $CO_2$ were to be released in a single precipitation stage with a single stage pressure reduction. The released $CO_2$ from each stage, that comprises only a portion of the total released $CO_2$, can also only be compressed from its own pressure up to the pressure of the preceding compression stage rather than recompressing all the released $CO_2$ from a final low pressure back up to the pressure of the dissolution stage. Thus, the operating pressures of the precipitation and recompression stages may be selected to optimise precipitation while minimising overall recompression energy; and
  interstage cooling of the recompressed $CO_2$ streams between stages which further provides a reduction in the recompression energy required as well as recovering entrained water or water vapour that can be added back to the process at the most favourable points. These points may be chosen so as to optimise temperatures and slurry concentrations within the process.

In one embodiment slurry exiting a dissolution reactor is subjected to a separation process in a separator that substantially separates solids from liquids, thus separating the slurry into a stream comprising a magnesium ion enriched carbonated aqueous liquid and a stream comprising magnesium depleted solid residue. The stream comprising a magnesium ion enriched carbonated aqueous liquid is fed to the precipitation reactors.

In another embodiment the present invention provides a reactor system adapted to perform the processes of the present invention. The reactor system comprises one or more dissolution reactors and one or more precipitation reactors adapted to provide the stage-wise pressure reduction and recovery of released $CO_2$ and precipitated magnesium carbonates.

In a further embodiment the system may comprise more than one dissolution reactor and more than one precipitation reactors arranged in series or parallel configuration, along with pre- and post-processing unit operations such as heat transfer and liquid/solid or liquid/gas separation processes. In this case the carbon dioxide liberated in respective degassing/precipitation reactors may be recycled to one or more dissolution reactors, at varying operating pressures and optionally other process conditions, to enhance process efficiency. In embodiments a concentrated $CO_2$ stream can be reacted with activated mineral feedstock in separate reactors or recycled to one or more dissolution reactors, to form magnesium carbonate through subsequent degassing/precipitation stages, thereby maximising the formation of magnesium carbonate as one valuable product of the invention.

The present invention may provide significant improvements over previous mineral carbonation processes, rendering the overall process more energetically and economically favourable than might have been expected and thus more competitive than the previous processes. The present invention may therefore provide a more favourable means of conversion of carbon dioxide into stable magnesium carbonates thereby enabling a reduction in the amount of carbon dioxide discharged to the atmosphere. Embodiments of the invention may be implemented under energetically beneficial operating conditions (including that of pressure and temperature) when compared with those conditions used conventionally for ex situ mineral carbonation. Embodiments of the invention may be implemented using carbon dioxide containing gas streams that contain acidic and/or other impurities at higher levels than conventional processes have otherwise allowed.

Embodiments of present invention will herein after be described with reference to the following non-limiting Examples.

Example 1

FIG. 1 shows a process flowsheet illustrating embodiments of the invention. For simplicity, intermediate heat exchangers, pumps and other process units have been omitted. It will be understood by those skilled in the art that such intermediate units are required at certain points in the process.

FIG. 1 shows a process with a single dissolution stage and two precipitation stages. It shows an activation process (1) wherein magnesium silicate mineral feed is heated, to produce an activated magnesium silicate mineral, a slurry make-up tank (2) where water is mixed with the activated magnesium silicate mineral to provide an aqueous slurry of the activated mineral, a dissolution reactor (4) where the slurry is contacted with a $CO_2$-containing gas stream (3) under pressure. Here the $CO_2$-containing gas stream comprises relatively pure $CO_2$ from a flue gas capture process and is pressurised to 600 kPa. The temperature in the dissolution reactor is 50° C. Here the magnesium silicate mineral feed has a mass median particle diameter of 37 microns. The slurry exiting the dissolution reactor vessel (4) passes to a separator (5) that substantially separates the slurry into a magnesium ion enriched carbonated aqueous liquid and magnesium depleted solid residue. The solid residue may form a first product stream and may be further processed such as by magnetic separation to recover iron or by acid leaching.

The magnesium ion enriched carbonated aqueous liquid from the separator (5) is fed into a first precipitation reactor (6) where precipitation of magnesium carbonate occurs as the pressure is reduced to 200 kPa. The temperature in the first precipitation reactor is 70° C. $CO_2$ gas liberated due to depressurisation is recompressed (7) and recycled back to the dissolution reactor (4). The slurry exiting the first precipitation reactor (6) passes to a separator (5A) that substantially separates the precipitated magnesium carbonate from the remaining magnesium ion aqueous liquid.

The remaining magnesium ion aqueous liquid from the separator (5A) is fed into a second precipitation reactor (6A) where further precipitation of magnesium carbonate occurs as the pressure is further reduced to 50 kPa. The temperature in the second precipitation reactor is 85° C. Further $CO_2$ gas liberated due to depressurisation is recompressed (7A) and blended with $CO_2$ released from the first precipitation reactor (6) before being further compressed (7) and recycled back to the dissolution reactor (4). The slurry exiting the second precipitation reactor (6A) passes to a separator (5B) that substantially separates the precipitated magnesium carbonate from the remaining magnesium ion aqueous liquid. The remaining magnesium ion liquid is recycled back to the slurry make-up tank (2).

Example 2

FIG. 2 shows a process flowsheet illustrating further embodiments of the invention. For simplicity, intermediate heat exchangers, pumps and other process units have been omitted. It will be understood by those skilled in the art that such intermediate units are required at certain points in the process.

FIG. 2 shows an activation process (1) wherein magnesium silicate mineral feed is heated and ground, to produce an activated magnesium silicate mineral having a mass median particle diameter of 45 microns, a slurry make-up tank (2) where water is mixed with the activated magnesium silicate mineral to provide an aqueous slurry of the activated mineral, a first dissolution reactor (4) where the slurry is contacted with a $CO_2$-containing gas stream that has been compressed (3). Here the $CO_2$-containing gas stream comprises a flue gas and is pressurised to 1000 kPa giving a $CO_2$ partial pressure of 80 kPa. The temperature in the dissolution reactor is 50° C. The slurry exiting the first dissolution reactor (4), comprises a magnesium ion enriched carbonated liquid and a magnesium depleted solid residue. In the second dissolution reactor (4A) magnesium is further dissolved from the mineral. Here the $CO_2$ partial pressure is 600 kPa and the temperature is 60° C. The slurry exiting the second dissolution reactor is fed into a separation unit (5) where aqueous liquid is separated from solid residue which comprises a silica rich product. The separated magnesium ion enriched carbonated aqueous liquid is fed into a series of precipitation reactors (6) and (6A) where the precipitation of magnesium carbonate occurs.

In this example, $CO_2$ gas is progressively released from the precipitation reactors (6 and 6A) by two successively staged reductions in pressure, causing a stage-wise increase in the liquid pH and inducing the precipitation of magnesium carbonate from the magnesium ion enriched carbonated aqueous liquid. The released $CO_2$ is recompressed (7A and 7B) and fed back to the second dissolution reactor (4A) at a pressure of 600 kPa. In the first precipitation reactor (6) the pressure is reduced to 200 kPa. The temperature in the first precipitation reactor is 60° C. The slurry exiting the first precipitation reactor (6) passes to a separator (5A) that substantially separates the precipitated magnesium carbonate from the remaining magnesium ion aqueous liquid.

The remaining magnesium ion aqueous liquid from the separator (5A) is fed into a second precipitation reactor (6A) where further precipitation of magnesium carbonate occurs as the pressure is further reduced to 50 kPa absolute by applying a partial vacuum. The temperature in the second precipitation reactor is 65° C. $CO_2$ gas liberated due to the depressurisation is recompressed (7B) and recycled back to the dissolution reactor (4A).

In this example a product stream is produced from the separator (5) that comprises silica-enriched solids. This stream may be further processed to produce high value products. In particular, it may be processed in a wet magnetic separator to remove an iron-rich fraction which may be a valuable product. The remaining silica-rich fraction may be another valuable product or may be further processed or purified, for example by acid leaching of any remaining metals. Further product streams are produced from the separators (5A and 5B) following the precipitation reactors (6 and 6A) by separating the slurry exiting the precipitation reactors into a solid-rich stream and a liquid-rich stream. The separated solid-rich streams comprise hydrated magnesium carbonate comprising nesquehonite which represents another valuable product. The liquid-rich streams are returned to the process.

Example 3

FIG. 3 shows a process flowsheet illustrating further embodiments of the invention. For simplicity, intermediate heat exchangers, pumps and other process units have been omitted. It will be understood by those skilled in the art that such intermediate units are required at certain points in the process.

FIG. 3 shows an activation process (1) wherein magnesium silicate mineral feed is heated and ground, to produce an activated magnesium silicate mineral having a mass median particle diameter of 45 microns, a slurry make-up tank (2) where water is mixed with the activated magnesium silicate mineral to provide an aqueous slurry of the activated mineral, a first dissolution reactor (4) where the slurry is contacted with a $CO_2$-containing gas stream that has been compressed (3). Here the $CO_2$-containing gas stream comprises a flue gas and is pressurised to 1000 kPa giving a $CO_2$ partial pressure of 80 kPa. The temperature in the first dissolution reactor (4) is 40° C. The slurry exiting the first dissolution reactor (4) comprises a magnesium ion enriched carbonated liquid and a magnesium depleted solid residue. In the second dissolution reactor (4A) magnesium is further dissolved from the mineral. Here the $CO_2$ partial pressure is 600 kPa and the temperature is 50° C. The slurry exiting the second dissolution reactor is fed into a separation unit (5) where aqueous liquid is separated from solid residue which comprises a silica rich product. The separated magnesium ion enriched carbonated aqueous liquid is fed into a series of precipitation reactors (6) and (6A) where the precipitation of magnesium carbonate occurs.

In this example, $CO_2$ gas is progressively released from the precipitation reactors (6 and 6A) by successively staged reductions in the pressure, causing a stage-wise increase in the liquid pH and inducing the precipitation of magnesium carbonate from the magnesium ion enriched carbonated aqueous liquid. In the first precipitation reactor (6) the pressure is reduced to 200 kPa. The temperature in the first precipitation reactor is 60° C. The slurry exiting the first precipitation reactor (6) is fed into a separation unit (5A) where aqueous liquid is substantially separated from solid which comprises hydrated magnesium carbonate product.

The remaining magnesium ion aqueous liquid from the separator (5A) is fed into a second precipitation reactor (6A) where further precipitation of magnesium carbonate occurs as the pressure is further reduced to 50 kPa absolute by applying a partial vacuum. The temperature in the second precipitation reactor is 65° C.

The $CO_2$ released from the second precipitation reactor (6A) is recompressed (7B) to the pressure of the first precipitation reactor (6) and is blended with $CO_2$ released from the first precipitation reactor (6). The blended $CO_2$ is recompressed (7A) to the pressure of the second dissolution reactor (4A) and blended with $CO_2$ released from the second dissolution reactor (4A). This example includes cooling units (8) and (8A) between the compression stages (7B) and (7A) and between (7A) and (7). Condensed water is removed from these cooling units and may be recycled back to the process for example at the make-up tank (2).

The slurry exiting the first precipitation reactor (6) passes to a separator (5A) that substantially separates the precipitated magnesium carbonate from the remaining magnesium ion aqueous liquid.

In this example a product stream is produced from the separator (5) that comprises silica-enriched solids. This stream may be further processed to produce high value products. In particular, it may be processed in a wet magnetic separator to remove an iron-rich fraction which may be a valuable product. The remaining silica-rich fraction may be another valuable product or may be further processed or purified, for example by acid leaching of any remaining metals. Further product streams are produced from the separators (5A and 5B) following the precipitation reactors (6 and 6A) by separating the slurry exiting the precipitation reactors into a solid-rich stream and a liquid-rich stream. The separated solid-rich streams comprise hydrated magnesium carbonate which represents another valuable product. The liquid-rich streams are returned to the process. While this example shows two precipitation stages, it is possible to use more than two such stages, with each stage at a lower pressure than the preceding stage. As for two such stages, the $CO_2$ released from each stage may be recompressed and recycled to a dissolution stage.

The invention claimed is:

1. An integrated process for carbon dioxide capture, sequestration and utilisation, which comprises:
    a) providing an aqueous slurry comprising an aqueous liquid and a particulate solid comprising an activated magnesium silicate mineral;
    b) in a dissolution stage, contacting a $CO_2$-containing gas stream with the aqueous slurry at a first pressure to dissolve magnesium from the mineral to provide a slurry comprising a magnesium ion enriched carbonated aqueous liquid and a magnesium depleted solid residue; and c) in a precipitation stage, precipitating magnesium carbonate from magnesium ions dissolved in step b) by multiple successive stage-wise reductions in pressure, with each stage being at a lower pressure than the preceding stage;

wherein each successive stage-wise reduction in pressure releases $CO_2$ which is correspondingly stage-wise compressed and recycled back into the dissolution stage.

2. The integrated process according to claim 1, wherein the magnesium ion enriched carbonated aqueous liquid is produced by dissolving the activated magnesium silicate mineral in one or more reactors fed by an input $CO_2$-containing gas stream above atmospheric pressure and thereafter, in two or more precipitation stages, inducing a pH shift in the liquid by the removal of dissolved $CO_2$ through reducing the pressure to the liquid thereby precipitating the magnesium carbonate.

3. The integrated process according to claim 1, wherein the magnesium ion enriched carbonated aqueous liquid is produced by dissolving the activated magnesium silicate mineral in one or more reactors fed by an input $CO_2$-containing gas stream near, at or above atmospheric pressure and thereafter, in two or more separate precipitation stages, inducing a pH shift in the solution by the removal of dissolved $CO_2$ through the application of a partial vacuum or sub-atmospheric pressure in at least one of the precipitation stages thereby precipitating the magnesium carbonate.

4. The integrated process according to claim 1, wherein the dissolution stage is performed in a dissolution reactor and slurry exiting the dissolution reactor is subjected to a separation process in a separator that substantially separates solids from liquids, thus separating the slurry into a slurry stream comprising the magnesium ion enriched carbonated aqueous liquid and a slurry stream comprising the magnesium depleted solid residue.

5. The integrated process according to claim 4, wherein the magnesium depleted solid residue is subjected to a wet magnetic separation process to extract an iron-rich portion therefrom.

6. The integrated process according to claim 4, wherein the magnesium depleted solid residue is subjected to chemical processing to purify silica contained therein.

7. The integrated process according to claim 6, wherein the chemical processing is acid leaching.

8. The integrated process according to claim 1, wherein the pressure in each dissolution stage is in the range 100-20000 kPa and the temperatures is in the range 20° C.-185° C.

9. The integrated process according to claim 1, wherein a stream comprising $CO_2$ released from any stage-wise reduction in pressure is compressed and blended with a stream comprising $CO_2$ released from any preceding stage before being further compressed and recycled back into the dissolution stage.

10. The integrated process according to claim 9, wherein a stream comprising $CO_2$ that has been compressed is cooled before being blended with a stream comprising $CO_2$ released from any preceding stage before being further compressed and recycled back into the dissolution stage.

11. The integrated process according to claim 10, wherein the cooling condenses entrained water vapour.

12. The integrated process according to claim 11, wherein the condensed water is recycled back to the process.

13. A reactor system adapted to perform the processes of claim 1, the reactor system comprising two or more precipitation reactors that are each adapted to provide the stage wise reduction in pressure and recover precipitated magnesium carbonates.

* * * * *